(12) United States Patent
Nikam

(10) Patent No.: US 9,159,367 B2
(45) Date of Patent: Oct. 13, 2015

(54) AUTOMATIC PLAYBACK OF ONE OR MORE EXCERPT(S) OF A VIDEO SEQUENCE ON A DATA PROCESSING DEVICE

(71) Applicant: NVIDIA Corporation, Santa Clara, CA (US)

(72) Inventor: Sachin Krishna Nikam, Maharashtra (IN)

(73) Assignee: NVIDIA Corporation, Santa Clara, CA (US)

( * ) Notice: Subject to any disclaimer, the term of this patent is extended or adjusted under 35 U.S.C. 154(b) by 67 days.

(21) Appl. No.: 13/969,633

(22) Filed: Aug. 19, 2013

(65) Prior Publication Data
US 2015/0050005 A1  Feb. 19, 2015

(51) Int. Cl.
| | | |
|---|---|---|
| *G11B 27/00* | (2006.01) | |
| *H04N 5/93* | (2006.01) | |
| *G11B 27/10* | (2006.01) | |
| *H04N 5/92* | (2006.01) | |
| *H04N 5/917* | (2006.01) | |

(52) U.S. Cl.
CPC .................................. *G11B 27/105* (2013.01)

(58) Field of Classification Search
USPC .......... 386/278, 280, 282, 283, 326, 329, 353
See application file for complete search history.

(56) References Cited

U.S. PATENT DOCUMENTS

| | | |
|---|---|---|
| 6,535,639 B1 | 3/2003 | Uchihachi et al. |
| 6,763,069 B1 | 7/2004 | Divakaran et al. |
| 7,669,130 B2 | 2/2010 | Agarwal et al. |
| 7,859,551 B2 | 12/2010 | Bulman et al. |
| 7,949,050 B2 | 5/2011 | Xu et al. |
| 8,489,991 B2 | 7/2013 | Sim et al. |
| 2007/0226313 A1 | 9/2007 | Li et al. |
| 2008/0031595 A1* | 2/2008 | Cho .............................. 386/108 |

* cited by examiner

*Primary Examiner* — Daquan Zhao
(74) *Attorney, Agent, or Firm* — Zilka-Kotab, PC

(57) ABSTRACT

A method includes initiating, through an interface of a data processing device, generation of one or more excerpt(s) of a video sequence associated with a video file stored in a memory of the data processing device. The method also includes automatically reading, through a processor of the data processing device communicatively coupled to the memory, video frames of the video file corresponding to the one or more excerpt(s) and reference video frames thereof in accordance with the initiation through the interface. Further, the method includes decoding, through the processor, the video frames of the video file corresponding to the one or more excerpt(s) and the reference video frames thereof following the automatic reading for rendering thereof on the data processing device.

17 Claims, 8 Drawing Sheets

AUTOMATIC PLAYBACK OF ONE OR MORE EXCERPT(S) OF A VIDEO SEQUENCE ON A DATA PROCESSING DEVICE

FIELD OF TECHNOLOGY

This disclosure relates generally to data processing devices and, more particularly, to automatic playback of one or more excerpt(s) of a video sequence on a data processing device.

BACKGROUND

A customer of a video store/parlor may desire to preview video data associated with a movie. The video store/parlor may not have a capability or a station to enable the customer preview the movie. Even if the store/parlor personnel generate a preview of the movie, post-processing of the video data may be an involved and inefficient process.

In another scenario, a user may wish to download the movie for a price. The user may not be excited about the movie enough based on media reviews. The lack of previews available of the movie may not help a cause thereof with regard to the user. Again, the content distributor may find the preview generation process for each movie involved and inefficient.

SUMMARY

Disclosed are a method, a device and/or a system of automatic playback of one or more excerpt(s) of a video sequence on a data processing device.

In one aspect, a method includes initiating, through an interface of a data processing device, generation of one or more excerpt(s) of a video sequence associated with a video file stored in a memory of the data processing device. The method also includes automatically reading, through a processor of the data processing device communicatively coupled to the memory, video frames of the video file corresponding to the one or more excerpt(s) and reference video frames thereof in accordance with the initiation through the interface. Further, the method includes decoding, through the processor, the video frames of the video file corresponding to the one or more excerpt(s) and the reference video frames thereof following the automatic reading for rendering thereof on the data processing device.

In another aspect, a non-transitory medium, readable through a data processing device and comprising instructions embodied therein that are executable through the data processing device, is disclosed. The non-transitory medium includes instructions to initiate, through an interface of the data processing device, generation of one or more excerpt(s) of a video sequence associated with a video file stored in a memory of the data processing device. The non-transitory medium also includes instructions to automatically read, through a processor of the data processing device communicatively coupled to the memory, video frames of the video file corresponding to the one or more excerpt(s) and reference video frames thereof in accordance with the initiation through the interface. Further, the non-transitory medium includes instructions to decode, through the processor, the video frames of the video file corresponding to the one or more excerpt(s) and the reference video frames thereof following the automatic reading for rendering thereof on the data processing device.

In yet another aspect, a data processing device includes a memory having a video file stored therein, a processor communicatively coupled to the memory, and an interface to enable initiation of generation of one or more excerpt(s) of a video sequence associated with the video file stored in the memory. In accordance with the initiation, the processor is configured to execute instructions to automatically read video frames of the video file corresponding to the one or more excerpt(s) and reference video frames thereof, and to decode the video frames of the video file corresponding to the one or more excerpt(s) and the reference video frames thereof following the automatic reading for rendering thereof on the data processing device.

The methods and systems disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Example embodiments, as described below, may be used to provide a method, a device and/or a system of automatic playback of one or more excerpt(s) of a video sequence on a data processing device. Although the present embodiments have been described with reference to specific example embodiments, it will be evident that various modifications and changes may be made to these embodiments without departing from the broader spirit and scope of the various embodiments.

Figure 1:
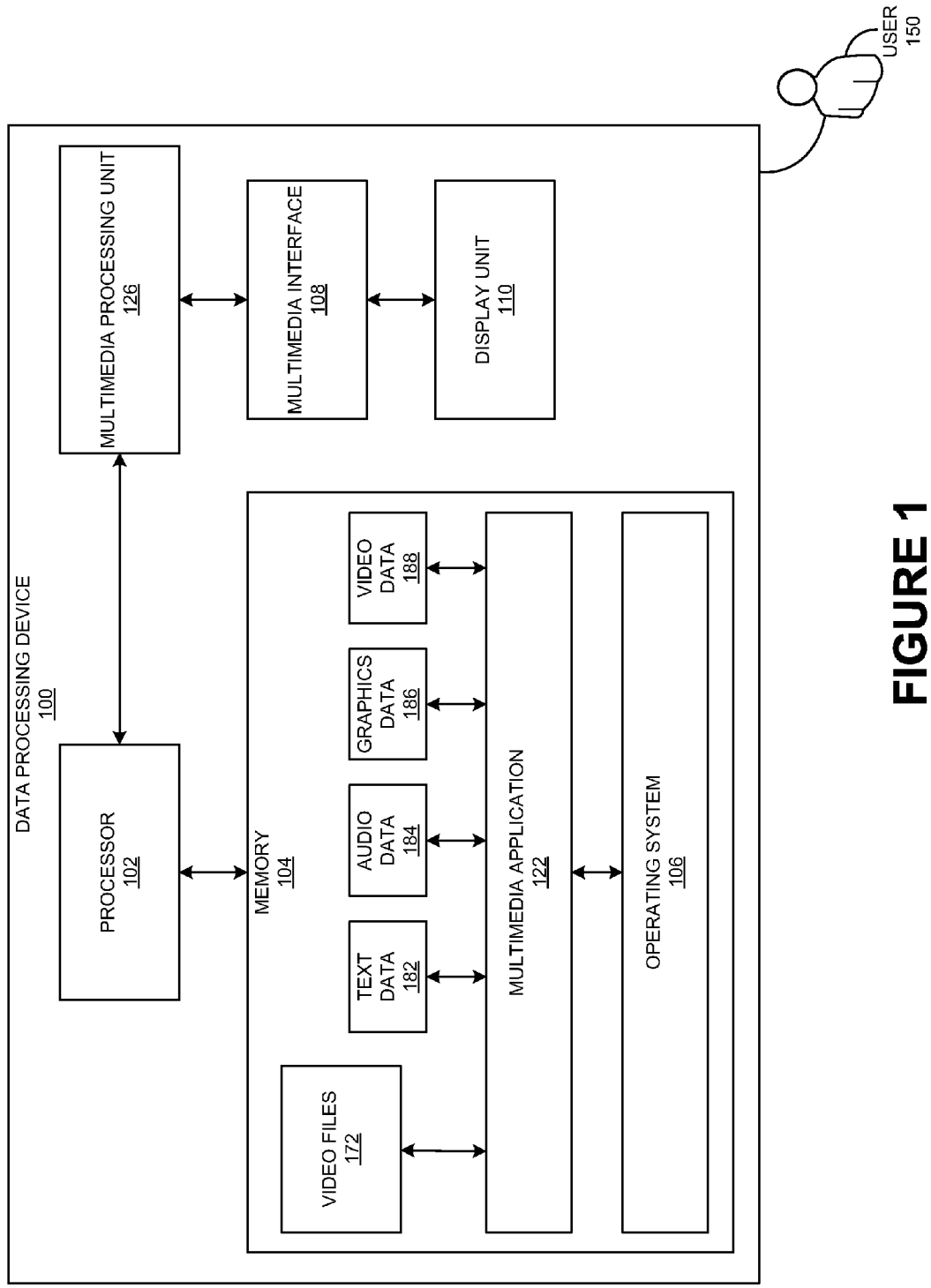
FIG. 1 is a schematic view of a data processing device, according to one or more embodiments.

FIG. 1 shows a data processing device 100, according to one or more embodiments. In one or more embodiments, data processing device 100 may be a desktop computer, a laptop computer, a notebook computer, a netbook or a mobile device such as a mobile phone or a tablet. Other forms of data processing device 100 are within the scope of the exemplary embodiments discussed herein. In one or more embodiments, data processing device 100 may include a processor 102 (e.g., Central Processing Unit (CPU) and/or Graphics Processing Unit (GPU)) communicatively coupled to a memory 104 (e.g., a volatile memory (e.g., Random Access Memory (RAM)) and/or a non-volatile memory (e.g., Read-Only Memory (ROM), hard disk)); memory 104 may include storage locations addressable through processor 102.

In one or more embodiments, output data associated with processing through processor 102 may be input to a multimedia processing unit 126 configured to perform encoding/decoding associated with the data. In one or more embodiments, the output of multimedia processing unit 126 may be rendered on a display unit 110 (e.g., a Liquid Crystal Display (LCD) display, a Cathode Ray Tube (CRT) monitor) through a multimedia interface 108 configured to convert data to an appropriate format required by display unit 110.

It is obvious that an operating system 106 may execute on data processing device 100. FIG. 1 shows operating system 106 as being stored in memory 104 (e.g., non-volatile memory). In one or more embodiments, data processing device 100 may execute a multimedia application 122 (e.g., Windows Media Player®) on processor 102; FIG. 1 shows multimedia application 122 as being stored in memory 104 to be executed on processor 102. In one or more embodiments, multimedia application 122 may utilize an Application Programming Interface (API) of a multimedia framework (to be discussed with regard to FIG. 2) in order to execute processing associated therewith.

Figure 2:
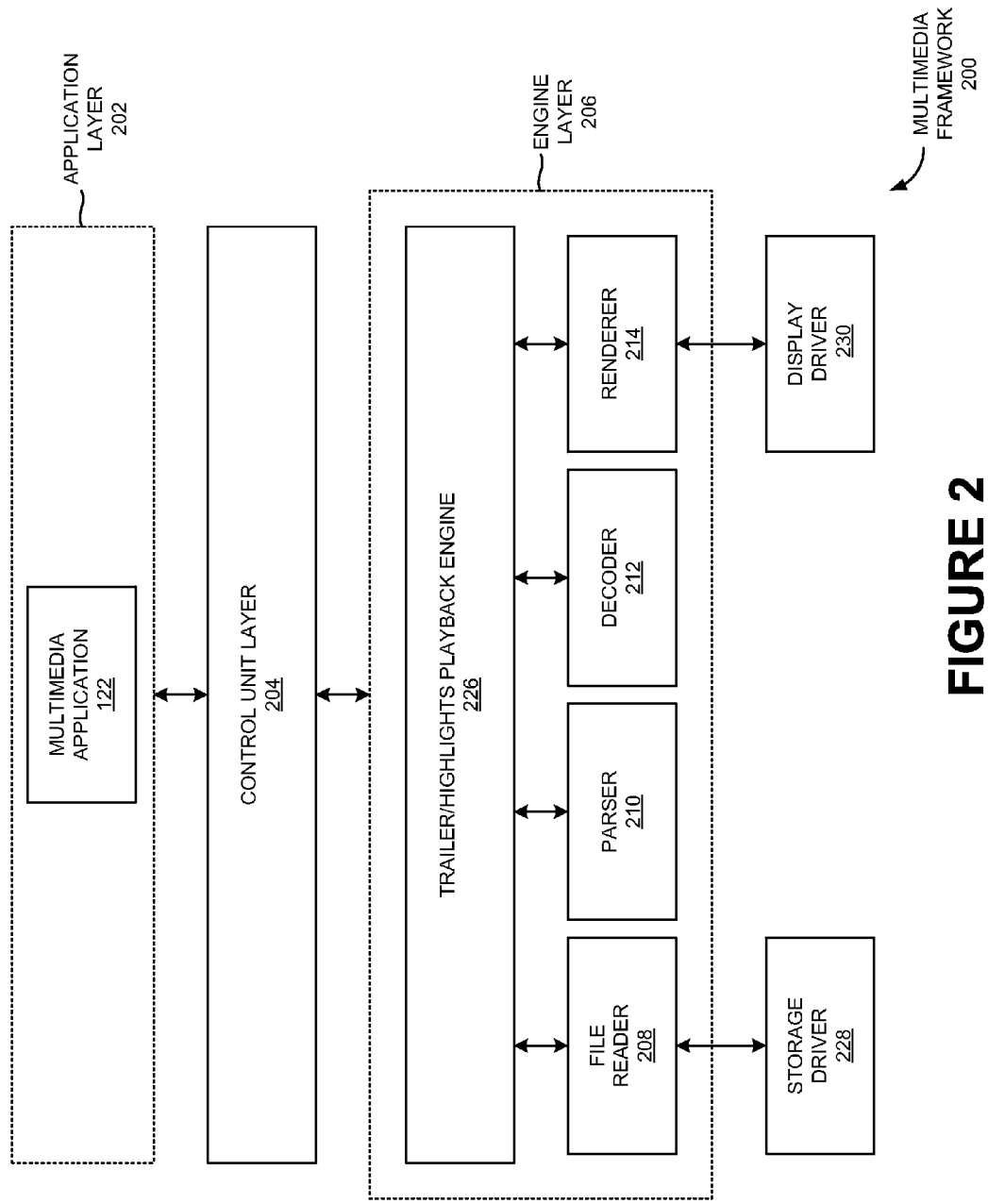
FIG. 2 is a schematic view of a multimedia framework implemented in the data processing device of FIG. 1, according to one or more embodiments.

FIG. 2 shows a multimedia framework 200 implemented in data processing device 100, according to one or more embodiments. In one or more embodiments, multimedia framework 200 may provide multimedia capture, processing and/or playback facilities utilizing local or remote sources. In one or more embodiments, multimedia framework 200 may be above a foundation layer that facilities access of hardware such as a soundcard/display unit 110. In one or more embodiments, multimedia framework 200 may include an application layer 202 configured to communicate with a control unit layer 204 to enable performing a task required by multimedia application 122. Thus, multimedia application 122 may be at a level of application layer 202. In one or more embodiments, control unit layer 204 may control dataflow through engines (or, modules; shown as part of engine layer 206) of multimedia framework 200 such as file reader 208, parser 210, decoder 212 and renderer 214.

File reader 208 may be configured to enable reading of data (e.g., video file, multimedia file) from a source. Parser 210 (e.g., Moving Picture Experts Group (MPEG) parser, Audio-Video Interleave (AVI) parser) may parse a stream of the data into constituent parts thereof. Decoder 212 may decode a compressed or an encoded version of the data and renderer 214 may transmit the decoded data to a destination (e.g., a rendering device). The rendering process may also include processes such as displaying multimedia on display unit 110, playing an audio file on a soundcard, writing the data to a file etc. It is obvious that the aforementioned engines (or, modules) are merely shown for illustrative purposes and that variations therein are within the scope of the exemplary embodiments.

FIG. 2 also shows storage driver 228 (e.g., a set of instructions) and display driver 230 (e.g., a set of instructions) being associated (by way of being communicatively coupled) with file reader 208 and renderer 214 respectively. Further, FIG. 2 shows a trailer/highlights playback engine 226 (e.g., a software engine) to enable software and/or hardware support for playing trailers/highlights of video sequences constituting video files (e.g., video files 172 shown stored in memory 104 of data processing device 100). In one or more embodiments, multimedia application 122 may provide an interface for a user 150 of data processing device 100 to enable application of desired settings on a video file 172 to be rendered therethrough and/or perform desired tasks during the rendering such as rewinding, fast-forwarding, playing and stopping. In one or more embodiments, the aforementioned interface may also offer user 150 the option of playing a trailer (e.g., an excerpt) and/or highlights of a video sequence constituting video file 172, as will be shown in FIG. 3.

Figure 3:
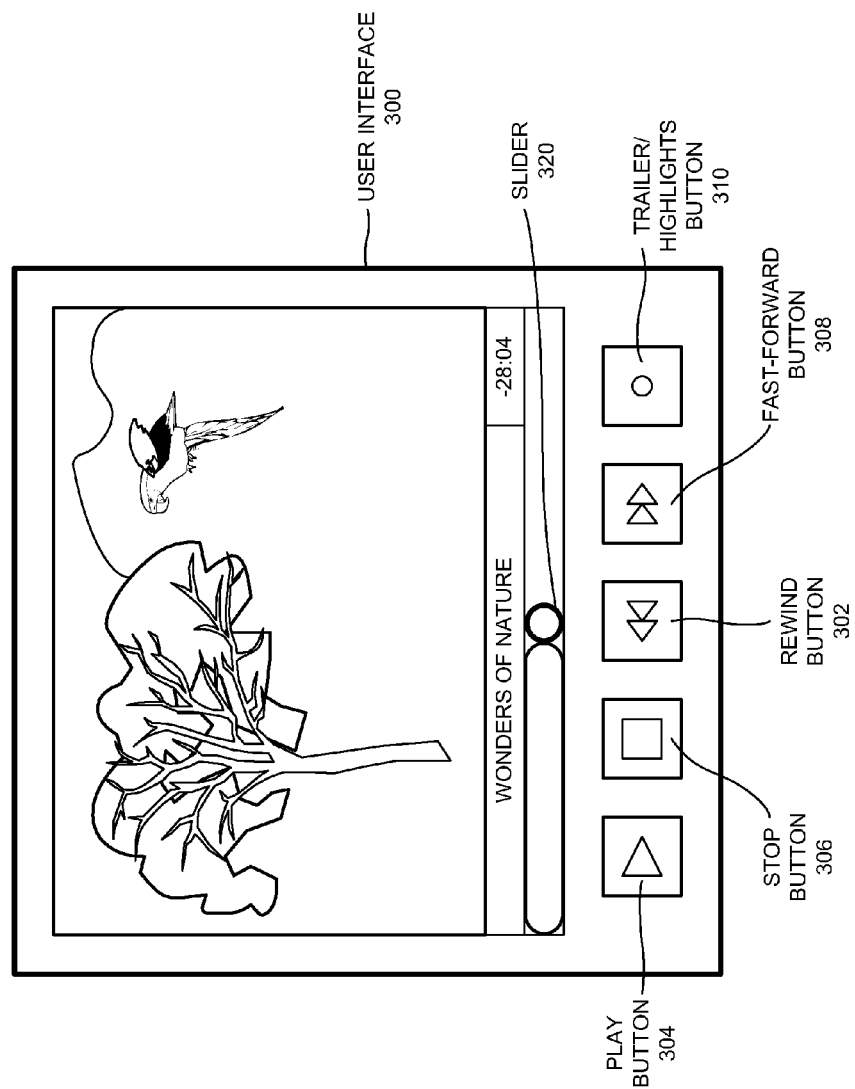
FIG. 3 is a schematic view of a user interface of a multimedia application executing on the data processing device of FIG. 1, according to one or more embodiments.

FIG. 3 shows a user interface 300 of multimedia application 122, according to one or more embodiments. In one or more embodiments, user interface 300 may include a rewind button 302, a play button 304, a stop button 306, a fast-forward button 308 and a trailer/highlights button 310. The aforementioned buttons are self-explanatory; initiation of playing a trailer and/or highlights of a video file through trailer/highlights button 310 may require a driver component (e.g., a driver of processor 102, a driver packaged with operating system 106, a driver packaged with multimedia application 122 and/or associated software) therefor. In one or more embodiments, multimedia application 122 may transmit events related to the action performed by user 150 on user interface 300 to multimedia framework 200. Now, if user 150 clicks an active trailer/highlights button 310 on multimedia application 122 after loading a video file on user interface 300, while viewing video file 172 on user interface 300 and the like, an event associated therewith may be transmitted to multimedia frame work 200. Here, in one or more embodiments, trailer/highlights playback engine 226 may detect video format of video file 172 and determine support for trailer/highlights playback of video file 172 therein.

Figure 4:
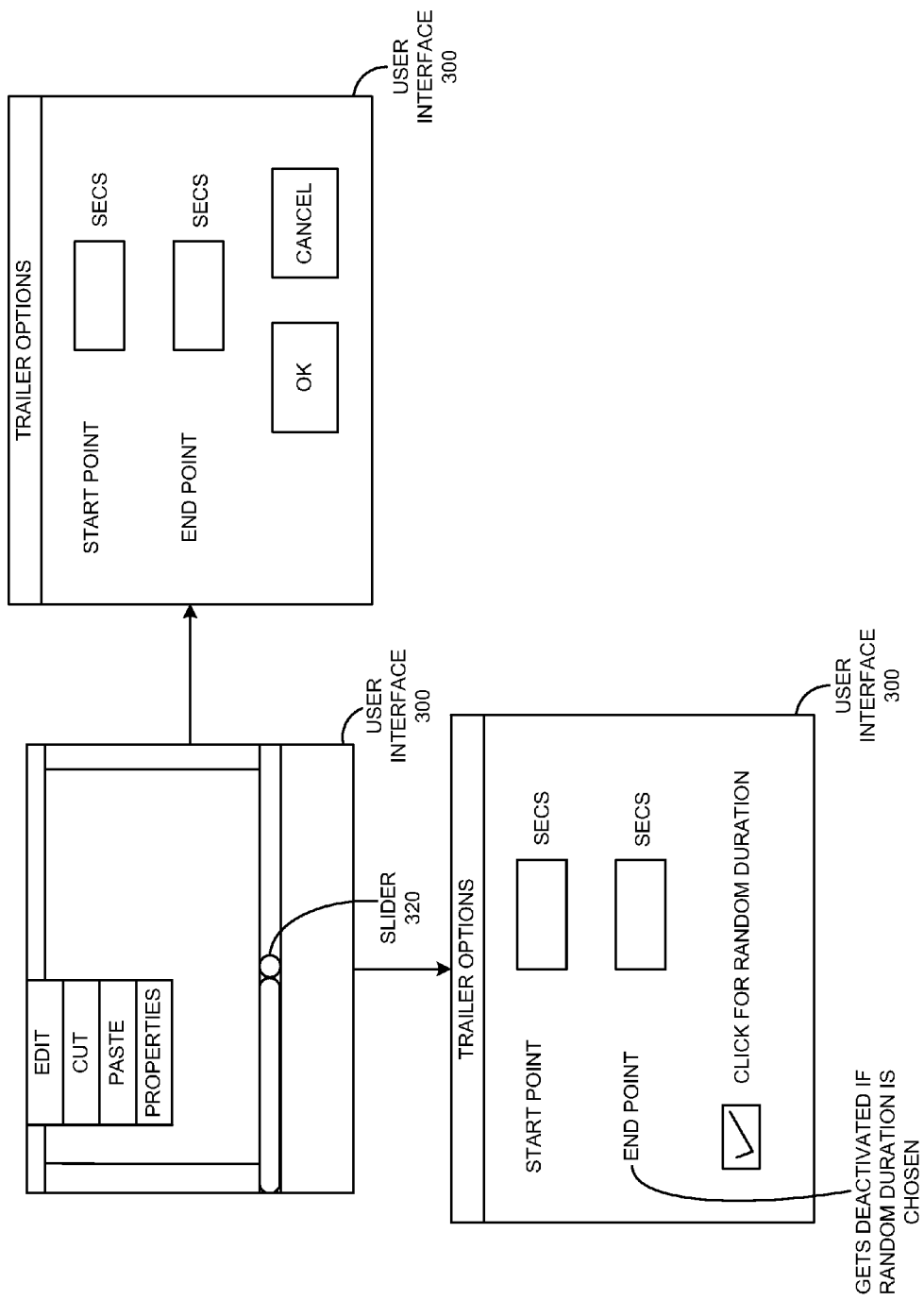
FIG. 4 is an illustrative view of providing an ability to a user of the data processing device of FIG. 1 to control duration of a trailer of a video sequence associated with a video file through the user interface of FIG. 3, according to one or more embodiments.

In one or more embodiments, user interface 300 may include a slider 320 configured to enable user 150 seek to a point in time within a video sequence associated with video file 172. FIG. 4 shows providing an ability to user 150 to control duration of a trailer of the video sequence associated with video file 172 through user interface 300. Here, user 150 may opt to start the trailer from a fixed point in time of the video sequence and end at a fixed point in time of the video sequence. In other words, the trailer may begin at a fixed point in time of the video sequence and may continue for a fixed duration. User 150 may also move slider 320 to begin from a desired point in time. Another possibility shown in FIG. 4 may involve the trailer beginning at the fixed point in time of the video sequence and continuing for a random duration (e.g., as randomly determined through processor 102/decoder 212).

Further, it is obvious that the trailer may begin at a random point in time (e.g., determined through processor 102/decoder 212) of the video sequence and may continue for a random duration thereof. Alternately, processor 102/decoder 212 may determine interesting content of the video sequence (e.g., based on a key frame of the video sequence and one or more video frames referencing the key frame) and may enable rendering of the interesting content for a duration corresponding thereto.

In one or more embodiments, once support for the trailer/highlights playback discussed above is determined, processor 102 (e.g., the engines discussed with regard to FIG. 2 may execute on processor 102) may start reading video frames of video file 172 from a point in time corresponding to a preference of user 150. Alternately, by default, processor 102 may start reading video frames of video file 172 from a point in time corresponding to a beginning of the video sequence associated therewith. In another example embodiment, processor 102 may start reading video frames of video file 172 from a point in time randomly determined.

Figure 5:
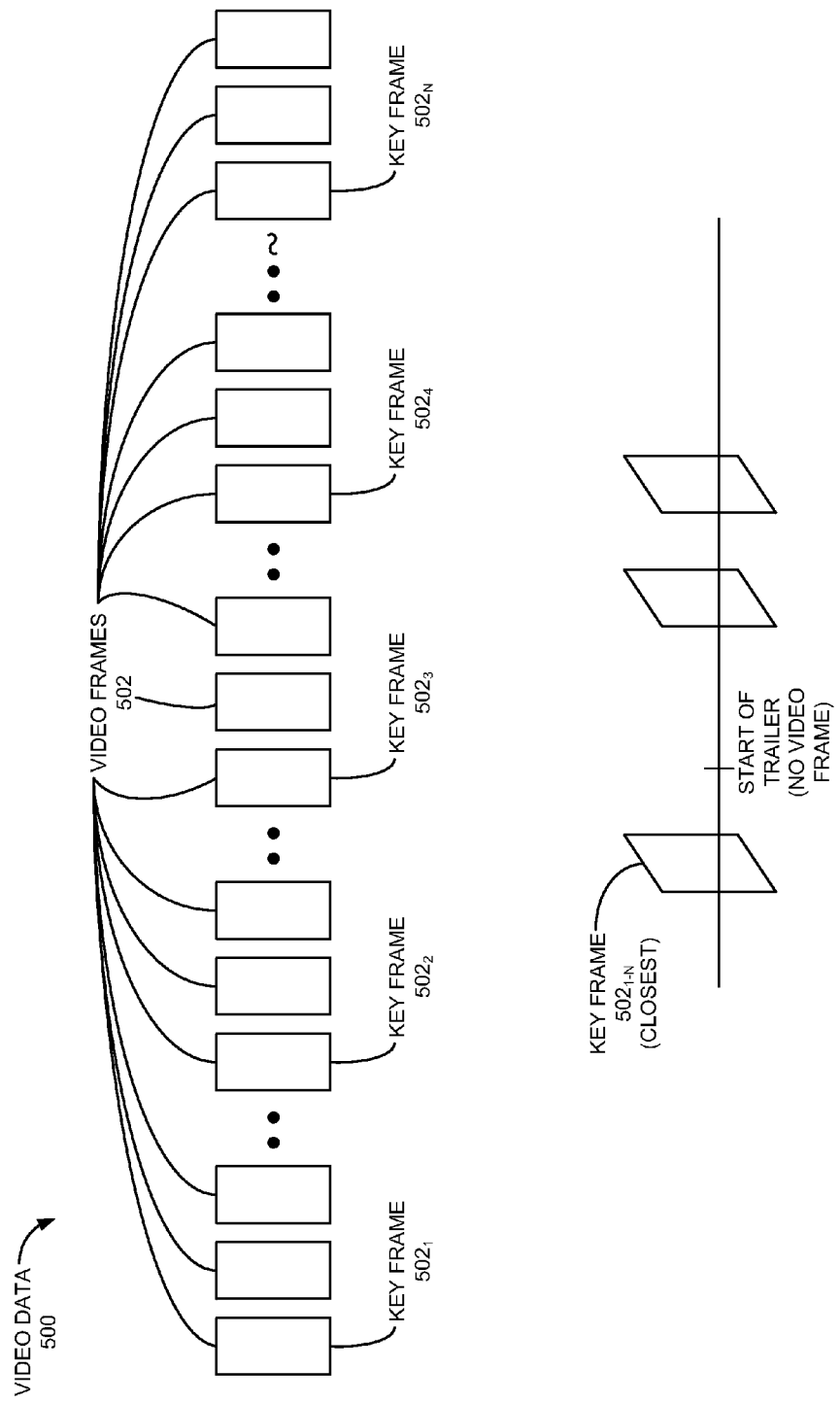
FIG. 5 is a schematic view of a video file including video frames encoded as a video sequence, according to one or more embodiments.

FIG. 5 shows video data 500 associated with video file 172 as including video frames 502 encoded as a video sequence, according to one or more embodiments. In one or more embodiments, video frames 502 may include key frames $502_{1-N}$ (e.g., intra-frame) temporally distributed (e.g., evenly) across the video sequence. In one or more embodiments, each key frame $502_{1-N}$ may represent a start and/or an end of a smooth transition in the video sequence. In accordance with playing a trailer of the video sequence and reading video frames therefor, in one or more embodiments, processor 102 (by way of decoder 212) may be configured to start decoding video frame(s) 502 from a point in time corresponding to a start of the trailer. If a video frame 502 corresponding to the aforementioned point in time is a key frame $502_{1-N}$ and/or an intra-frame, key frame $502_{1-N}$ and/or the intra-frame may be independently decoded. If video frame 502 corresponding to the start of the trailer is a predicted/bi-predicted frame, one or more reference video frame(s) thereof may be decoded prior to the decoding of video frame 502.

Figure 6:
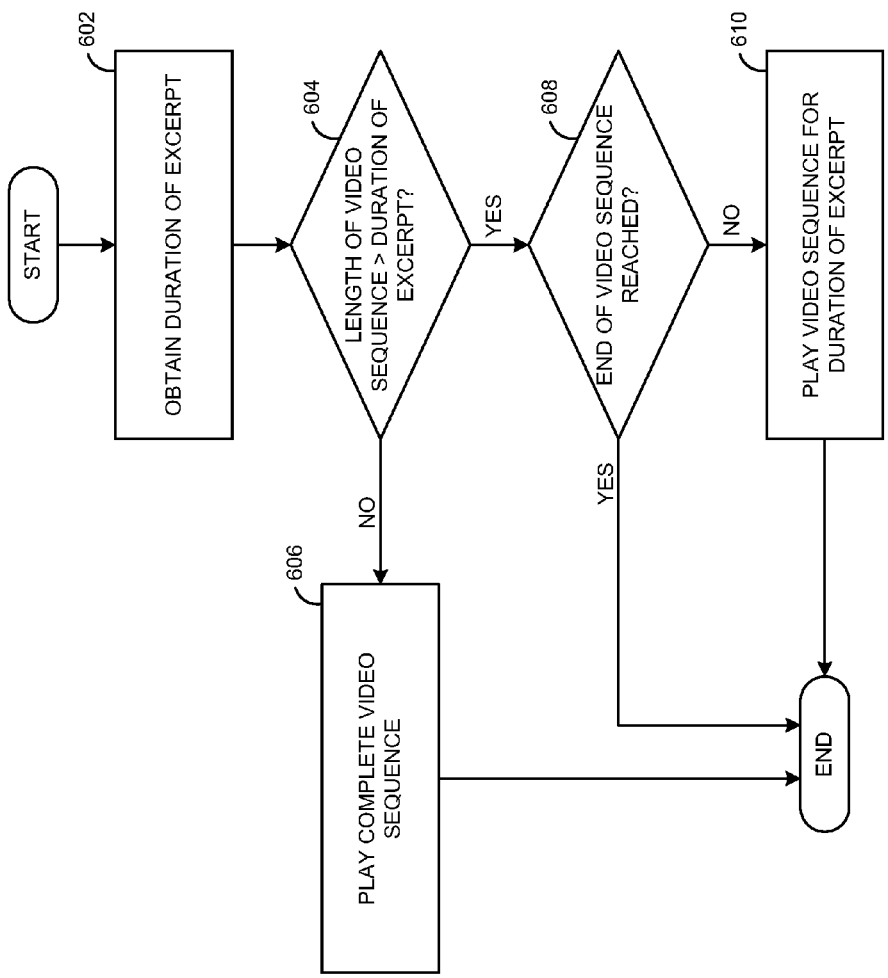
FIG. 6 is a flowchart detailing high-level operations involved in playing an excerpt (or, trailer) of the video sequence associated with the video file of FIG. 5, according to one or more embodiments.

In certain scenarios, in accordance with seeking to the point in time corresponding to the start of the trailer, processor 102 (or, decoder 212) may be configured to begin decoding from a key frame $502_{1-N}$ closest to the aforementioned point in time, as shown in FIG. 5; an example reason may be the unavailability of a video frame at the aforementioned point in time. In one or more embodiments, the decoding of appropriate video frames 502 may proceed until the point in time corresponding to the end of the trailer. FIG. 6 shows a flowchart summarizing the high-level operations involved in playing an excerpt (or, trailer) of a video sequence associated with video file 172, according to one or more embodiments. In one or more embodiments, operation 602 may involve obtaining, through processor 102, a length of the video sequence associated with video file 172. In one or more embodiments, operation 602 may also involve obtaining, through processor 102, duration of the excerpt (or, trailer) to be played. In one or more embodiments, operation 604 may involve checking, through processor 102, as to whether the length of the video sequence is large enough to extract the excerpt based on the duration thereof.

In one or more embodiments, if the result of operation 604 is a no, operation 606 may involve playing (e.g., on user interface 300) the complete video sequence. In one or more embodiments, if the result of operation 604 is a yes, operation 608 may involve checking as to whether the end of the video sequence is reached. In one or more embodiments, if the result of operation 608 is a no, operation 610 may involve playing the video sequence for the duration of the excerpt obtained through processor 102. Else, in one or more embodiments, video playback may be exited.

It should be noted that the trailer may not be limited to merely playing one excerpt of the video sequence. In one or more other embodiments, processor 102 may enable playing of an excerpt followed by seeking to another point in time of the video sequence. Then, processor 102 may be configured to play another excerpt of pre-determined (e.g., user determined) or random duration. The number of excerpts may also be pre-determined (e.g., user determined) or randomly determined.

Figure 7:
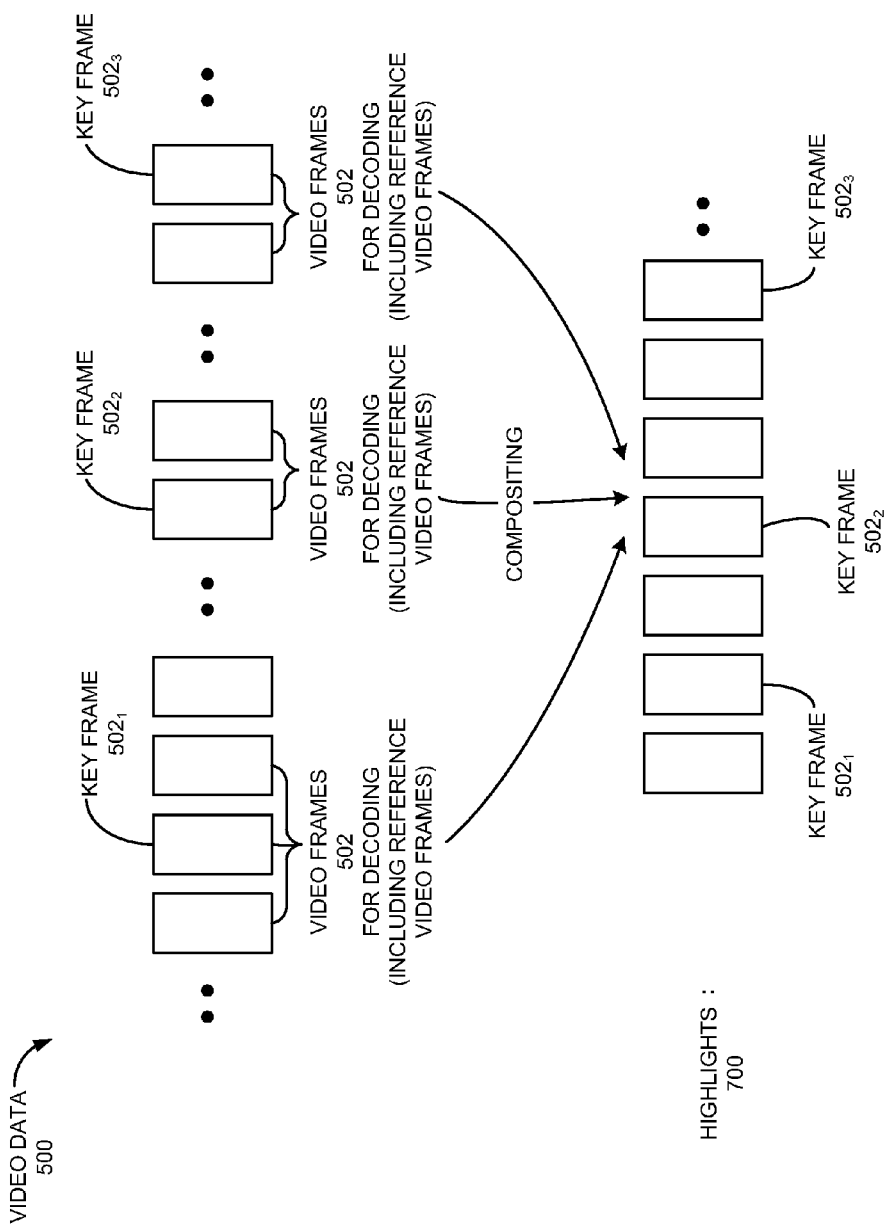
FIG. 7 is a schematic view of generation of highlights of the video sequence associated with the video file of FIG. 5, according to one or more embodiments.

FIG. 7 shows generation of highlights 700 of the video sequence, according to one or more embodiments. In one or more embodiments, in accordance with the reading of video frames 502 to generate highlights 700 of the video sequence, decoder 212 (e.g., executing on processor 102) may be configured to decode each key frame $502_{1-N}$ and one or more video frame(s) 502 temporally closest to the each key frame $502_{1-N}$. In one or more embodiments, for the decoding of the one or more video frame(s) 502 around the each key frame $502_{1-N}$, one or more reference video frame(s) of the one or more video frame(s) 502 may also have to be decoded. In one example embodiment, a reference video frame of a video frame 502 around a key frame $502_{1-N}$ may be the same key frame $502_{1-N}$. In one or more embodiments, the algorithm executing on processor 102 (or, decoder 212) to extract highlights 700 of the video sequence may skip decoding video frames 502 other than the each key frame $502_{1-N}$ and one or more video frame(s) 502 (and the one or more reference video frame(s) thereof) around the each key frame $502_{1-N}$.

It should be noted that processor 102 (or, decoder 212) may select an appropriate number of video frame(s) 502 around the each key frame $502_{1-N}$ to provide for an effect of completeness to a partial video sequence associated therewith. In one or more embodiments, the decoded each key frame $502_{1-N}$ and the one or more video frame(s) 502 temporally closest thereto may be composited (e.g., through processor 102/decoder 212) with one or more other sets of decoded key frames $502_{1-N}$ and one or more video frame(s) 502 temporally closest thereto to form highlights 700 of the video sequence. In one or more embodiments, text data, audio data (e.g., a voice-over), graphics data and/or other video data may be superimposed through processor 102 at appropriate temporal points in time of highlights 700 to provide for completeness thereof. FIG. 1 shows text data 182, audio data 184, graphics data 186 and video data 188 as being stored in memory 104 to be appropriately applied onto highlights 700 through processor 102.

It should be noted that each video frame 502 may have timestamp information 182 (shown as being stored in memory 104) thereof available to decoder 212 (or, processor 102) to convenience seeking to appropriate points in time during generation of the trailer and/or compositing video frames 502 together during generation of highlights 700. Further, in one or more embodiments, user 150 may be provided the option (e.g., through user interface 300) to save the trailer and/or highlights 700 of the video sequence into memory 104.

It is obvious that the engines of multimedia framework 200 may be executed through processor 102. The driver component or equivalent software thereof discussed above may be stored in memory 104 to be installed on data processing device 100 after, for example, a download through the Internet. Alternately, an external memory may be utilized therefor. Also, instructions associated with the driver component may be embodied on a non-transitory medium readable through data processing device 100 such as a Compact Disc (CD), a Digital Video Disc (DVD), a Blu-ray Disc®, a floppy disk, a hard drive and a diskette. The aforementioned instructions may be executable through data processing device 100.

The sets of instructions associated with the driver component or equivalent software thereof and/or the generation of the trailer and/or highlights 700 are not limited to specific embodiments discussed above, and may, for example, be implemented in operating system 106, an application program (e.g., multimedia application 122), a foreground or a background process, a network stack or any combination thereof. Also, it is obvious that the trailer/highlights playback process may be initiated through a physical button on data processing device 100, a touchscreen option on data processing device 100, a menu option on-screen on data processing device 100 etc. Further, user 150 may be provided an option to enable/disable trailer/highlights playback in data processing device 100. Other variations are within the scope of the exemplary embodiments discussed herein.

Thus, exemplary embodiments provide user 150 with a means to obtain a glimpse of a long video sequence through the trailer/highlights 700 without manual fast-forwarding and/or seeking to points in time of the video sequence through user interface 300. Exemplary embodiments are amenable to implementation at video stores (e.g., physical and online) and/or parlors where user 150 may obtain glimpses of video sequences. Last but not the least, exemplary embodiments provide for fun and entertainment value to user 150 through the capability to generate trailers/highlights of video sequences.

Figure 8:
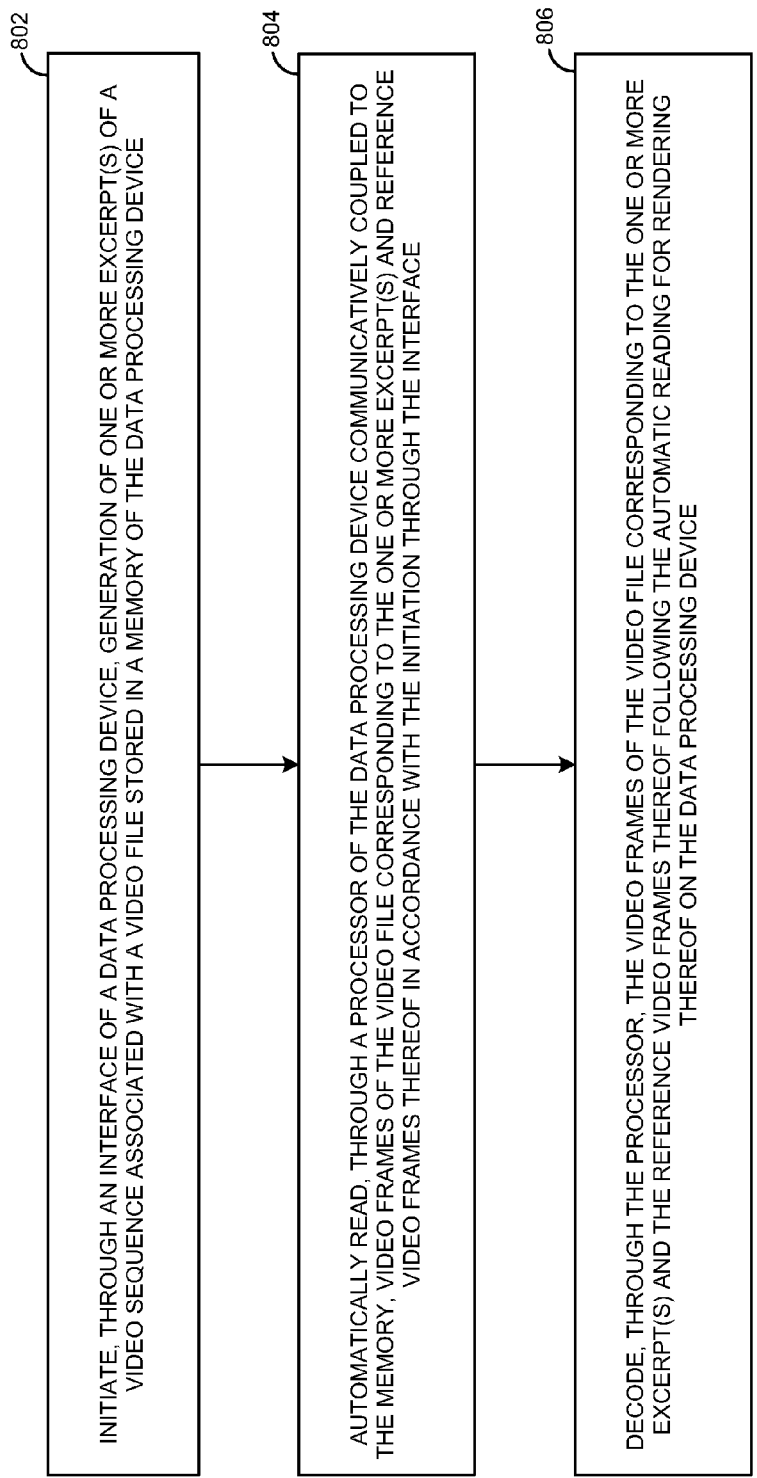
FIG. 8 is a process flow diagram detailing the operations involved in automatic generation of one or more excerpt(s) of a video sequence on the data processing device of FIG. 1, according to one or more embodiments.

FIG. 8 shows a process flow diagram detailing the operations involved in automatic generation of one or more excerpt(s) (e.g., a trailer, highlights 700) of a video sequence on data processing device 100, according to one or more embodiments. In one or more embodiments, operation 802 may involve initiating, through an interface (e.g., user interface 300) of data processing device 100, generation of one or more excerpt(s) of the video sequence associated with a video file 172 stored in memory 104. In one or more embodiments, operation 804 may involve automatically reading, through processor 102, video frames 502 of video file 172 corresponding to one or more excerpt(s) and reference video frames thereof in accordance with the initiation through the interface.

In one or more embodiments, operation 806 may then involve decoding, through processor 102, video frames 502 of video file 172 corresponding to the one or more excerpt(s) and the reference video frames thereof following the automatic reading for rendering thereof on data processing device 100.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry, firmware, software or any combination of hardware, firmware, and software (e.g., embodied in a non-transitory machine-readable medium). For example, the various electrical structures and methods may be embodied using transistors, logic gates, and electrical circuits (e.g., Application Specific Integrated Circuitry (ASIC) and/or Digital Signal Processor (DSP) circuitry).

In addition, it will be appreciated that the various operations, processes, and methods disclosed herein may be embodied in a non-transitory machine-readable medium and/or a machine accessible medium compatible with a data processing system (e.g., data processing device 100), and may be performed in any order (e.g., including using means for achieving the various operations).

Accordingly, the specification and drawings are to be regarded in an illustrative rather than a restrictive sense.

What is claimed is:

1. A method comprising:
    initiating, through an interface of a data processing device, generation of at least one excerpt of a video sequence associated with a video file stored in a memory of the data processing device;
    automatically reading, through a processor of the data processing device communicatively coupled to the memory, video frames of the video file corresponding to the at least one excerpt and reference video frames thereof in accordance with the initiation through the interface; and
    decoding, through the processor, the video frames of the video file corresponding to the at least one excerpt and the reference video frames thereof following the automatic reading for rendering thereof on the data processing device, wherein the decoding of the video frames and the reference video frames further comprises:
        decoding, through the processor, each key frame of the video sequence, at least one video frame around the each key frame of the video sequence temporally closest thereto and at least one reference video frame of the at least one video frame around the each key frame;
        decoding, through the processor, at least one another set of a decoded key frame, at least one video frame around the decoded key frame and at least one reference video frame thereof;
        skipping decoding other video frames of the video sequence; and
        compositing, through the processor, the decoded each key frame, the at least one video frame around the each key frame and the at least one reference video frame thereof with the at least one another set of the decoded key frame, the at least one video frame around the decoded key frame and the at least one reference video frame thereof to generate highlights of the video sequence as the at least one excerpt.

2. The method of claim 1, wherein the decoding of the video frames and the reference video frames further comprises:
    automatically reading, through the processor, the video frames of the video file from a point in time corresponding to one of: a beginning of the video sequence, a point in time of the video sequence determined through the interface and a point in time of the video sequence randomly determined through the processor prior to the decoding of the video frames and the reference video frames;
    one of:
        independently decoding, through the processor, a video frame corresponding to the point in time if the video frame is at least one of: a key frame and an intra-frame;
        decoding, through the processor, at least one reference video frame of the video frame corresponding to the point in time if the video frame is one of: a predicted frame and a bi-predicted frame; and
        decoding, through the processor, a key frame temporally closest to the point in time if the video frame corresponding to the point in time is unavailable; and
    continuing decoding, through the processor, the video frames until a point in time corresponding to an end of the at least one excerpt.

3. The method of claim 2, comprising:
    automatically reading, through the processor, the video frames of the video file corresponding to an excerpt of a plurality of excerpts of the video sequence and the reference video frames thereof;
decoding, through the processor, the video frames of the video file corresponding to the excerpt and the reference video frames thereof following the automatic reading;
seeking, through the processor, to another point in time of the video sequence corresponding to another excerpt of the plurality of excerpts;
automatically reading, through the processor, video frames of the video file corresponding to the another excerpt and reference video frames thereof; and
decoding, through the processor, the video frames of the video file corresponding to the another excerpt and the reference video frames thereof following the automatic reading.

4. The method of claim 1, further comprising one of:
controlling, through the interface, at least one of: a point in time corresponding to a beginning of the at least one excerpt, a duration of the at least one excerpt and a number of excerpts when a plurality of excerpts is to be decoded; and
randomly determining, through the processor, the at least one of: the point in time corresponding to the beginning of the at least one excerpt, the duration of the at least one excerpt and the number of excerpts when the plurality of excerpts is to be decoded.

5. The method of claim 1, further comprising applying at least one of text data, audio data, graphics data and video data stored in the memory at appropriate points in time of the generated highlights through the processor.

6. The method of claim 1, further comprising:
implementing a multimedia framework on the data processing device;
transmitting, through a multimedia application, an event related to the generation of the at least one excerpt to the multimedia framework; and
generating the at least one excerpt through the multimedia framework, in conjunction with the processor.

7. A non-transitory medium, readable through a data processing device and comprising instructions embodied therein that are executable through the data processing device, comprising:
instructions to initiate, through an interface of the data processing device, generation of at least one excerpt of a video sequence associated with a video file stored in a memory of the data processing device;
instructions to automatically read, through a processor of the data processing device communicatively coupled to the memory, video frames of the video file corresponding to the at least one excerpt and reference video frames thereof in accordance with the initiation through the interface; and
instructions to decode, through the processor, the video frames of the video file corresponding to the at least one excerpt and the reference video frames thereof following the automatic reading for rendering thereof on the data processing device, wherein the instructions to decode the video frames and the reference video frames further comprise instructions to:
decode, through the processor, each key frame of the video sequence, at least one video frame around the each key frame of the video sequence temporally closest thereto and at least one reference video frame of the at least one video frame around the each key frame;
decode, through the processor, at least one another set of a decoded key frame, at least one video frame around the decoded key frame and at least one reference video frame thereof;
skip decoding other video frames of the video sequence; and
composite, through the processor, the decoded each key frame, the at least one video frame around the each key frame and the at least one reference video frame thereof with the at least one another set of the decoded key frame, the at least one video frame around the decoded key frame and the at least one reference video frame thereof to generate highlights of the video sequence as the at least one excerpt.

8. The non-transitory medium of claim 7, comprising instructions to:
automatically read, through the processor, the video frames of the video file from a point in time corresponding to one of: a beginning of the video sequence, a point in time of the video sequence determined through the interface and a point in time of the video sequence randomly determined through the processor prior to the decoding of the video frames and the reference video frames;
one of:
independently decode, through the processor, a video frame corresponding to the point in time if the video frame is at least one of: a key frame and an intra-frame;
decode, through the processor, at least one reference video frame of the video frame corresponding to the point in time if the video frame is one of: a predicted frame and a bi-predicted frame; and
decode, through the processor, a key frame temporally closest to the point in time if the video frame corresponding to the point in time is unavailable; and
continually decode, through the processor, the video frames until a point in time corresponding to an end of the at least one excerpt.

9. The non-transitory medium of claim 8, comprising instructions to:
automatically read, through the processor, the video frames of the video file corresponding to an excerpt of a plurality of excerpts of the video sequence and the reference video frames thereof;
decode, through the processor, the video frames of the video file corresponding to the excerpt and the reference video frames thereof following the automatic reading;
seek, through the processor, to another point in time of the video sequence corresponding to another excerpt of the plurality of excerpts;
automatically read, through the processor, video frames of the video file corresponding to the another excerpt and reference video frames thereof; and
decode, through the processor, the video frames of the video file corresponding to the another excerpt and the reference video frames thereof following the automatic reading.

10. The non-transitory medium of claim 7, further comprising instructions to one of:
control, through the interface, at least one of: a point in time corresponding to a beginning of the at least one excerpt, a duration of the at least one excerpt and a number of excerpts when a plurality of excerpts is to be decoded; and randomly determine, through the processor, the at least one of: the point in time corresponding to the beginning of the at least one excerpt, the duration of the at least one excerpt and the number of excerpts when the plurality of excerpts is to be decoded.

11. The non-transitory medium of claim 7, further comprising instructions to apply at least one of text data, audio data, graphics data and video data stored in the memory at appropriate points in time of the generated highlights through the processor.

12. The non-transitory medium of claim 7, further comprising instructions to:
implement a multimedia framework on the data processing device; transmit, through a multimedia application, an event related to the generation of the at least one excerpt to the multimedia framework; and generate the at least one excerpt through the multimedia framework, in conjunction with the processor.

13. A data processing device comprising:
a memory comprising a video file stored therein;
a processor communicatively coupled to the memory; and
an interface to enable initiation of generation of at least one excerpt of a video sequence associated with the video file stored in the memory,
wherein, in accordance with the initiation, the processor is configured to execute instructions to:
automatically read video frames of the video file corresponding to the at least one excerpt and reference video frames thereof, and
decode the video frames of the video file corresponding to the at least one excerpt and the reference video frames thereof following the automatic reading for rendering thereof on the data processing device, wherein the processor is further configured to execute instructions to:
decode each key frame of the video sequence, at least one video frame around the each key frame of the video sequence temporally closest thereto and at least one reference video frame of the at least one video frame around the each key frame,
decode at least one another set of a decoded key frame, at least one video frame around the decoded key frame and at least one reference video frame thereof,
skip decoding other video frames of the video sequence, and
composite the decoded each key frame, the at least one video frame around the each key frame and the at least one reference video frame thereof with the at least one another set of the decoded key frame, the at least one video frame around the decoded key frame and the at least one reference video frame thereof to generate highlights of the video sequence as the at least one excerpt.

14. The data processing device of claim 13, wherein the processor is configured to execute instructions to:
automatically read the video frames of the video file from a point in time corresponding to one of: a beginning of the video sequence, a point in time of the video sequence determined through the interface and a point in time of the video sequence randomly determined through the processor prior to the decoding of the video frames and the reference video frames,
one of:
independently decode a video frame corresponding to the point in time if the video frame is at least one of: a key frame and an intra-frame,
decode at least one reference video frame of the video frame corresponding to the point in time if the video frame is one of: a predicted frame and a bi-predicted frame, and
decode a key frame temporally closest to the point in time if the video frame corresponding to the point in time is unavailable, and
continually decode the video frames until a point in time corresponding to an end of the at least one excerpt.

15. The data processing device of claim 14, wherein the processor is configured to execute instructions to:
automatically read the video frames of the video file corresponding to an excerpt of a plurality of excerpts of the video sequence and the reference video frames thereof,
decode the video frames of the video file corresponding to the excerpt and the reference video frames thereof following the automatic reading,
seek to another point in time of the video sequence corresponding to another excerpt of the plurality of excerpts,
automatically read video frames of the video file corresponding to the another excerpt and reference video frames thereof, and
decode the video frames of the video file corresponding to the another excerpt and the reference video frames thereof following the automatic reading.

16. The data processing device of claim 13, wherein one of:
the interface is capable of being utilized to control at least one of: a point in time corresponding to a beginning of the at least one excerpt, a duration of the at least one excerpt and a number of excerpts when a plurality of excerpts is to be decoded, and
the processor is configured to execute instructions to randomly determine the at least one of: the point in time corresponding to the beginning of the at least one excerpt, the duration of the at least one excerpt and the number of excerpts when the plurality of excerpts is to be decoded.

17. The data processing device of claim 13, wherein the processor is further configured to execute instructions to apply at least one of text data, audio data, graphics data and video data stored in the memory at appropriate points in time of the generated highlights.

* * * * *